US007971253B1

(12) United States Patent
Gupta

(10) Patent No.: US 7,971,253 B1
(45) Date of Patent: Jun. 28, 2011

(54) METHOD AND SYSTEM FOR DETECTING ADDRESS ROTATION AND RELATED EVENTS IN COMMUNICATION NETWORKS

(75) Inventor: Deepak Gupta, Pune (IN)

(73) Assignee: AirTight Networks, Inc., Mountain View, CA (US)

( * ) Notice: Subject to any disclaimer, the term of this patent is extended or adjusted under 35 U.S.C. 154(b) by 975 days.

(21) Appl. No.: 11/770,760

(22) Filed: Jun. 29, 2007

Related U.S. Application Data

(60) Provisional application No. 60/866,816, filed on Nov. 21, 2006.

(51) Int. Cl.
*G06F 9/00* (2006.01)
(52) U.S. Cl. .......................................... 726/23; 726/11
(58) Field of Classification Search .................. 726/22, 726/23, 11, 13, 25
See application file for complete search history.

(56) References Cited

U.S. PATENT DOCUMENTS

| 7,110,756 | B2 * | 9/2006 | Diener ........................... 455/423 |
| 7,286,515 | B2 | 10/2007 | Olson et al. |
| 7,302,269 | B1 | 11/2007 | Crawford et al. |
| 7,307,980 | B1 | 12/2007 | Shah |
| 7,540,028 | B2 * | 5/2009 | Ahmed et al. .................. 726/23 |
| 2003/0185244 | A1 | 10/2003 | Wu et al. |
| 2008/0141369 | A1 * | 6/2008 | Butti et al. ........................ 726/22 |
| 2008/0250498 | A1 * | 10/2008 | Butti et al. ........................ 726/23 |

OTHER PUBLICATIONS

Bellovin: "A Technique For Counting NATed Hots", AT&T Research, IMW02, Nov. 6-8, 2002, Marseille, France, Copyright 2002, pp. 267-272.
Wright: "Detecting Wireless LAN MAC Address Spoofing", Jan. 21, 2003, Copyright 2003, Joshua Wright, 20 pgs.
Source code of a wireless monitoring toll available on the Internet, http://svn.kismetwireless.net/code/tags/kismet-2004-10-R1/ CHANGELOG, Jun. 9, 2004, 2 pgs.
Guo et al.: "Sequence Number-Based MAC Address Spoof Detection," in Proceedings of 8th International Symposium on Recent Advances in Intrusion Detection (RAID 2005), Sep. 2005, 20 pgs.
Brian Moran, The hacker's wireless toolbox: part 2, Computerworld, alleged July 17, 2003, http://www.computerworld.com/mobiletopics/mobile/story/0,10801,83152,00.html.

* cited by examiner

*Primary Examiner* — Nirav B Patel
*Assistant Examiner* — Randal D Moran
(74) *Attorney, Agent, or Firm* — AirTight Networks; Hemant M. Chaskar

(57) ABSTRACT

A method for detecting address rotation by a device in a communication network includes receiving, at a first time, a first message transmitted by the device, receiving, at a second time, a second message transmitted by the device, and processing the first message to determine a first sequence number and a first transmitter address. The method also includes processing the second message to determine a second sequence number and a second transmitter address, determining that the second transmitter address is different from the first transmitter address, determining a time gap between the first time and the second time, and determining, based, in part, on the time gap, a sequence threshold value. The method further includes determining a sequence difference between the first sequence number and the second sequence number, determining that the sequence difference is less than the sequence threshold value, and providing an indication of address rotation by the device.

16 Claims, 9 Drawing Sheets

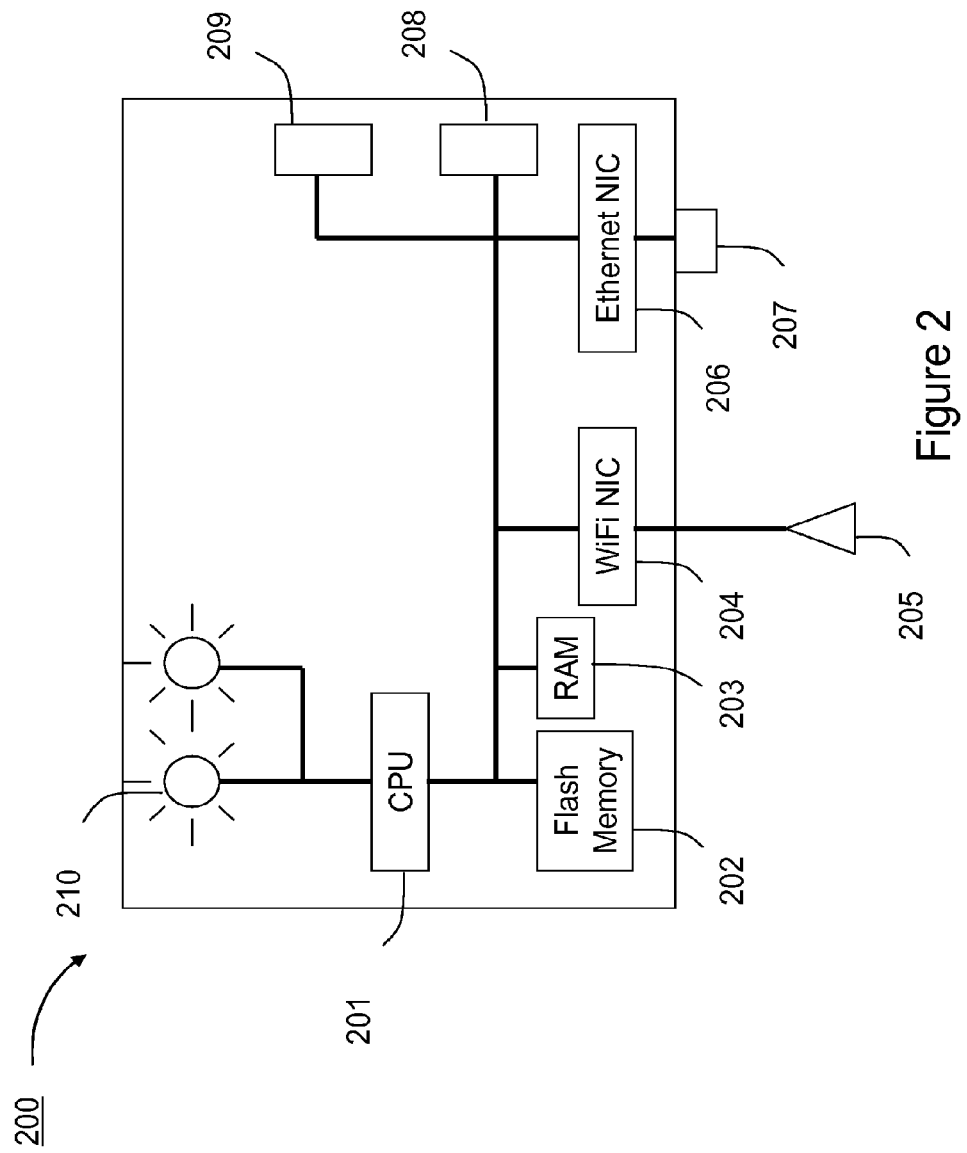

METHOD AND SYSTEM FOR DETECTING ADDRESS ROTATION AND RELATED EVENTS IN COMMUNICATION NETWORKS

CROSS-REFERENCES TO RELATED APPLICATIONS

This present application claims priority to the U.S. Provisional Application No. 60/866,816, titled "Method and system for detecting address rotation and related events in communication networks", filed on Nov. 21, 2006; commonly assigned, and hereby incorporated by reference for all purposes.

BACKGROUND OF THE INVENTION

The present invention relates generally to computer networking techniques. More particularly, the invention provides methods and systems for intrusion (attack) detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others. It will be appreciated that applications extend to other computer networking techniques.

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic area (e.g., an office, building floor, building, home, or any other defined geographic region (indoor and/or outdoor)) are typically interconnected using a Local Area Network (LAN) (e.g. the Ethernet). The LANs, in turn, can be interconnected with each other using a Wide Area Network (WAN)(e.g., the Internet). A conventional LAN can be deployed using an Ethernet-based infrastructure comprising cables, hubs switches, and other elements.

Connection ports (e.g., Ethernet ports) can be used to couple multiple computer systems to the LAN. For example, a user can connect to the LAN by physically attaching a computing device (e.g., a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g., file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. The IEEE 802.11 family of standards (WiFi) is a common standard for such wireless communication. In WiFi, the 802.11b standard provides for wireless connectivity at speeds up to 11 Mbps in the 2.4 GHz radio frequency spectrum; the 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum. The standards such as 802.11n provide even higher connectivity speeds.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP.

The application of wireless communication to computer networking can introduce additional security exposure. Specifically, the radio waves that are integral to wireless communication often cannot be contained inside or outside the physical space bounded by physical structures, such as the walls of a building. Because of this signal penetration, unauthorized users, who could be using their wireless devices in a nearby street, parking lot, or building, could launch security attacks on the wireless networks. Moreover, several weak points in the IEEE 802.11 MAC standards have been recently discovered which make such wireless networks easy target for denial of service (DOS) attacks. See for example, a paper by Bellardo and Savage entitled, "802.11 Denial-of-Service Attacks: Real Vulnerabilities and Practical Solutions" published in the 12th USENIX Security Symposium in August 2003, for discussion on deauthentication, disassociation and virtual carrier sense DOS attacks. Other types of DOS attacks such as authentication flood, association flood and EAPOL START flood can also be launched on the 802.11 wireless networks. In the DOS attack, an attacker sitting in street, parking lot, or neighboring premises can bring down the wireless network of an organization. This can cause significant loss of productivity.

Conventional techniques can be used for detecting such attacks with varying degrees of success. For example, certain principles of conventional threshold crossing/flooding/anomaly detection can be applied to this problem in a naïve manner. Certain examples of threshold crossing/flooding/anomaly detection techniques can be found in U.S. Pat. No. 6,321,338 to Porras et al. entitled "Network surveillance." However such naïve application is rife with problems such as false alarms, impracticality of threshold tuning and others as described throughout the present specification and more particularly below.

From the above, techniques for improving security in wireless networks, and in particular the ability to accurately detect security attacks without causing false alarms, are highly desired.

SUMMARY OF THE INVENTION

The present invention relates generally to computer networking techniques. More particularly, the invention provides methods and systems for intrusion (attack) detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others. In a specific embodiment, the invention provides for reducing false alarms during attack detection, but it would be appreciated that applications extend to other computer networking techniques.

According to an embodiment of the present invention, a method for detecting address rotation by a device in a communication network is provided. The method includes receiving, at a first time, a first message transmitted by the device, receiving, at a second time, a second message transmitted by the device, and processing the first message to determine a first sequence number and a first transmitter address. The method also includes processing the second message to determine a second sequence number and a second transmitter address. The method further includes determining that the second transmitter address is different from the first transmitter address, determining a time gap between the first time and the second time, and determining, based, in part, on the time gap, a sequence threshold value. Moreover, the method includes determining a sequence difference between the first sequence number and the second sequence number, determining that the sequence difference is less than the sequence threshold value, and providing an indication of address rotation by the device.

In an embodiment, a method for detecting a denial of service attack in a wireless network is provided. Advantageously the method is substantially free from false alarms due to threshold crossings that are often encountered in conventional techniques. The method includes detecting N connection requests for an access point device transmitted over a wireless medium. Here N is an integer no less than 2. The method includes identifying N requester identities in the N connection requests, respectively, and determining that the N requester identities include at least M distinct requester identities. Here M is an integer no greater than N. The method also includes determining that M exceeds a predetermined threshold. Moreover, the method includes detecting an address rotation process. In this embodiment, the address rotation process being a single wireless device transmitting a plurality of connection requests for the access point device including a plurality of distinct requester identities, respectively. The method includes providing an indication of the denial of service attack on the access point device based at least on the determining that M exceeds the predetermined threshold and the detecting the address rotation process.

According to a specific embodiment of the present invention, a method for reducing false alarms during detection of address spoofing in communication network is provided. In this embodiment, the address spoofing is characterized by a plurality of devices claiming a common transmitter address. The method includes receiving two messages transmitted over wireless network. The two messages include a first message and a second message. The method also includes processing the two messages to determine a first sequence number and a second sequence number associated with the first message and the second message, respectively. The method further includes processing the two messages to determine a first transmitter address and a second transmitter address associated with the first message and the second message, respectively, and includes ascertaining that the second transmitter address is the same as the first transmitter address. Moreover, the method includes determining a time gap between the two messages, determining, based at least on the time gap, a range within which the second sequence number is expected to lie with respect to the first sequence number, and inferring an indication of the address spoofing if the second sequence number lies outside the range within which the second sequence number is expected to lie.

According to an alternative embodiment of the present invention, a system for detecting address rotation by a device in a communication network is provided. The system includes a receiver module, a storage module and a processor module. The receiver module includes one or more wireless communication receiving interfaces for receiving a plurality of messages transmitted over a wireless network. The storage module includes one or more electronic memory devices for storing computer executable code. The computer executable code comprises various portions. A first portion of the code is for identifying transmitter addresses in the plurality of messages received by the receiver module, respectively. A second portion of the code is for computing one or more receiving time gaps associated with one or more message pairs, respectively. The one or more message pairs comprise messages from the plurality of messages received by the receiver module. A third portion of the code is for computing one or more sequence number threshold values associated with the one or more receiving time gaps, respectively. A fourth portion of the code is for computing one or more sequence number differences associated with the one or more message pairs, respectively. A fifth portion of the code is for comparing the one or more sequence number differences with the one or more sequence number thresholds, respectively. The processor module includes one or more micro processing devices. The processor module is for executing the first, the second, the third, the fourth and the fifth portions of the code to detect the address rotation by the device.

Numerous benefits are achieved by way of the present invention over conventional techniques. For example, embodiments of the present invention provide methods to detect address rotation during attacks. Moreover, embodiments of the present invention reduce the number of false alarms produced during the attack detection process. Depending upon the embodiment, one or more of these benefits may exist. These and other benefits have been described throughout the present specification and more particularly below. Various additional objects, features, and advantages of the present invention can be more fully appreciated with reference to the detailed description and accompanying drawings that follow.

BRIEF DESCRIPTION OF THE DRAWINGS

FIG. 2 is a simplified schematic diagram of a sensor device according to an embodiment of the present invention;

DETAILED DESCRIPTION OF SPECIFIC EMBODIMENTS

The present invention relates generally to computer networking techniques. More particularly, the invention provides methods and systems for intrusion (attack) detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others. In a specific embodiment, the invention provides for reducing false alarms during attack detection.

The application of wireless communication to computer networking has introduced new security risks. Specifically, the radio waves that are integral to wireless communication often cannot be contained inside or outside the physical space bounded by physical structures, such as the walls of a building. Because of this signal leakage, unauthorized users, who could be using their wireless devices in a nearby street, parking lot, or building, could launch security attacks on the wireless networks. Moreover, several weak points in the IEEE 802.11 MAC standards have been recently discovered which make such wireless networks easy target for denial of service (DOS) attacks. While certain conventional techniques can be used for detecting such attacks they are rife with problems such as false alarms, impracticality of threshold tuning and others. The present invention provides method and system for improved detection of such attacks.

Figure 1:
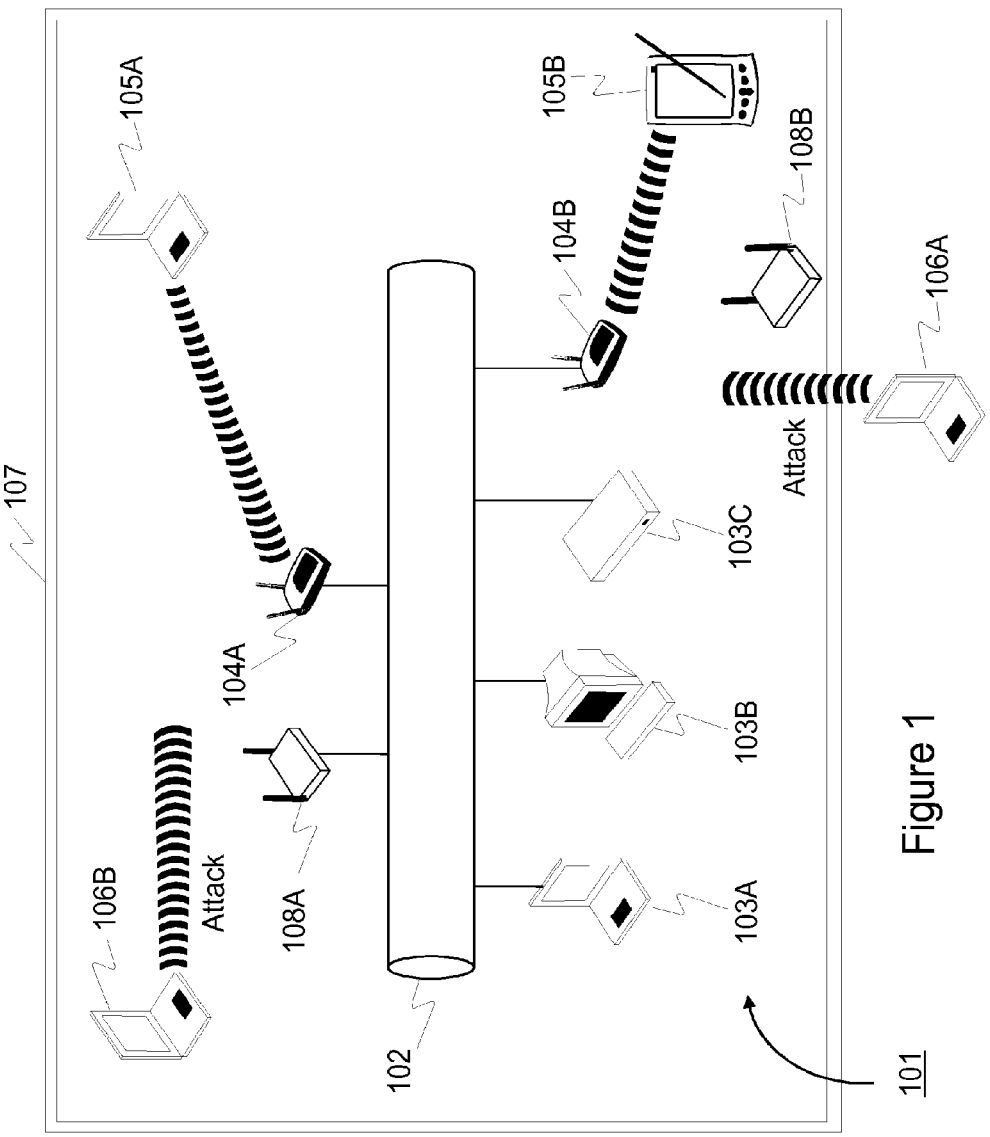
FIG. 1 is a simplified local area network according to an embodiment of the present invention.

FIG. 1 illustrates a simplified local area network (LAN) 101 that can facilitate intrusion detection according to an embodiment of the present invention. This diagram is merely an example, which should not unduly limit the scope of the invention. One of ordinary skill in the art would recognize many variations, modifications, and alternatives. In LAN 101, a core transmission infrastructure 102 can include various transmission components, e.g. Ethernet cables, hubs, and switches. In a typical deployment, the core transmission infrastructure 102 comprises one or more network segments. According to one embodiment, a network segment refers to an IP "subnetwork" (called "subnet"). Each subnet is identified by a network number (e.g. IP number and subnet mask) and plurality of subnets are interconnected using router devices. Notably, the plurality of subnets of the LAN 101 can be geographically distributed (e.g. in offices of a company in different geographic locations). The geographically distributed segments are interconnected via virtual private network (VPN).

One or more connection ports (e.g. Ethernet sockets) can be provided on each of the segments for connecting various computer systems to the LAN 101. Thus, one or more end user devices 103 (such as desktop computers, notebook computers, telemetry sensors etc.) can be connected to LAN 101 via one or more connection ports using wires (e.g., Ethernet cables) or other suitable connection means.

In this embodiment, a wireless extension of LAN 101 is also provided. For example, authorized APs 104A and 104B can be connected to LAN 101 directly or via intervening WiFi switch.

In this configuration, one or more end user devices 105 (such as desktop computers, laptop computers, handheld computers, PDAs, etc.) equipped with radio communication capability can wirelessly connect to LAN 101 via the authorized APs 104. Note that WiFi or another type of wireless network format (e.g. UWB, WiMax, Bluetooth, etc.) can be used to provide the wireless protocols.

FIG. 1 also shows unauthorized devices (e.g., device 106A outside the region of operation 107 of LAN 101, device 106B within the region of operation of LAN 101, etc.) which can launch security attacks on the network. For example the unauthorized devices can launch DOS attacks on the wireless network.

In accordance with one aspect of the invention, an intrusion detection system can be used to detect security attacks on the LAN 101. The intrusion detection system can include one or more RF sensor/detection devices (e.g. sensor devices 108A and 108B, each generically referenced herein as a sensor or sniffer 108) disposed within or in a vicinity of the region 107 comprising LAN 101. In one embodiment, the sensor 108 can be connected to LAN 101 via a connection port (e.g., using wires) (e.g., sensor 108A) or using a wireless connection. The sensor can then collaborate/communicate with other computer systems on the LAN 101 such as database server, graphical user interface device, other security monitoring systems etc. In an alternative embodiment, the sensor 108 may not be connected to the LAN 101 (e.g., the sensor 108B) and can operate as standalone device.

The sensor 108 is able to monitor wireless activity in a subset of the vicinity of the region 107. Wireless activity can include any transmission of control, management, or data packets between an AP and one or more wireless stations, or among one or more wireless stations. Wireless activity can even include communication for establishing a wireless connection between an AP and a wireless station (called "association"). In general, sensor 108 can listen to a radio channel and capture transmissions on that channel. In one embodiment, sensor can cycle through multiple radio channels on which wireless communication could take place. On each radio channel, it can wait and listen for any ongoing transmission. In one embodiment, sensor can operate on multiple radio channels simultaneously.

Whenever a transmission is detected, sensor 108 can collect and record the relevant information about that transmission. This information can include all or a subset of information gathered from various fields in a captured packet (frame). Examples of information gathered include information about type of packet (e.g., data, connection request, connection response, authentication request, EAP START packet, beacon, probe request etc.), addresses in packet (e.g., source MAC address, destination MAC address, cell identifier/BSSID etc.), sequence numbers in packet and like. The information can also include timestamp associated with the reception of the packet. The sensor can then perform analysis on the collected data for detection of attacks on the network. Alternatively, the sensor can send the collected data or a summarized/partially processed version of the collected data to other computer systems for analysis and detection of attacks.

In one embodiment, sensor 108 can be built using a hardware platform similar to that used to build an AP, although having different functionality and software. In one embodiment, to more unobtrusively be incorporated in the defined geographic region, sensor could have a small form factor. In one embodiment, a sensor could also be provided with radio transmit interface, thereby allowing it to generate interference with a suspected intruder's transmission. The radio transmit interface could also be used by the sensor for active probing which involves transmission of test signals.

An exemplary hardware diagram of the sensor is shown in FIG. 2. This diagram is merely an example, which should not unduly limit the scope of the invention. One of ordinary skill in the art would recognize many variations, alternatives, and modifications. As shown, sensor 108 can have a central processing unit (CPU) 201, a flash memory 202 where the software code for sniffer functionality resides, and a RAM 203 which serves as volatile memory during program execution. The sensor 108 can have one or more 802.11 wireless network interface cards (NICs) 204 which perform radio and wireless MAC layer functionality and one or more of dual-band (i.e., for transmission detection in both the 2.4 GHz and 5 GHz radio frequency spectrums) antennas 205 coupled to the wireless NICs. Each of the wireless NICs 204 can operate in IEEE 802.11a, b, g, n mode, or mixtures thereof. Moreover, the sensor 108 can have an Ethernet NIC 206 which performs Ethernet physical and MAC layer functions, an Ethernet jack 207 such as RJ-45 socket coupled to the Ethernet NIC for connecting the sensor device to wired LAN with optional power over Ethernet or POE, and a serial port 208 which can be used to flash/configure/troubleshoot the sensor device. A power input 209 is also provided. One or more light emitting diodes (LEDs) 210 can be provided on the sensor device to convey visual indications (such as device working properly, error condition, undesirable wireless activity alert, and so on). In an alternative embodiment, the sensor functionality and the AP functionality can be combined in a single hardware platform. In yet an alternative embodiment, sensor 108 can be provided as a software module on computer systems such as laptops, desktops, palmtops and others.

According to a specific embodiment, the present invention provides a method for detecting DOS attacks in local area networks of computing devices. In alternative specific embodiment, the present invention provides a method for reducing false alarms during attack detection. In an embodiment, this method can be implemented using one or more sensors 108. In an alternative embodiment, this method can be implemented using one or more sensors and one or more computing systems which collaborate with the sensors. This method is described more particularly below.

Figure 3A:
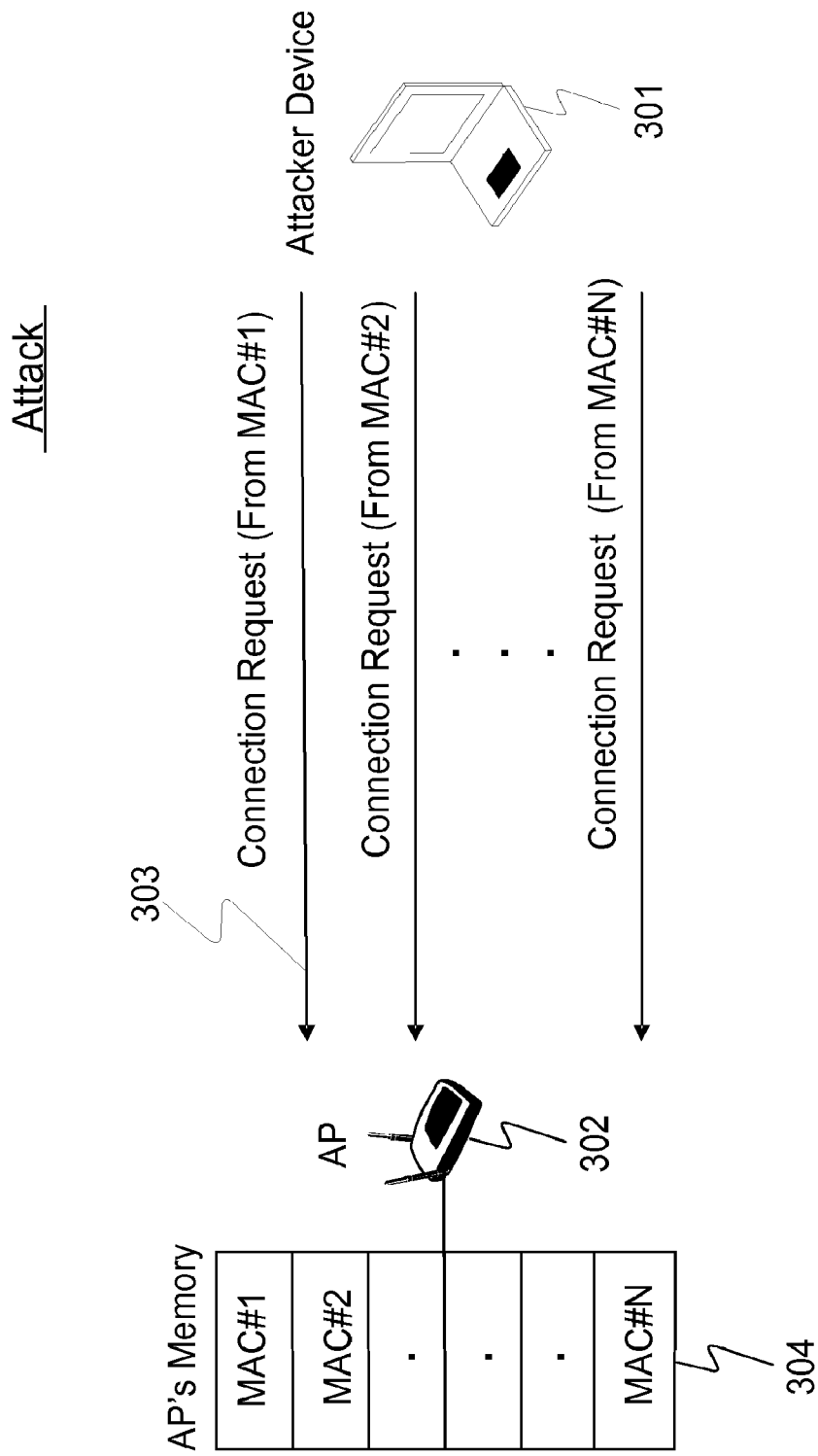
FIG. 3A is a simplified communication flow illustrating a DOS attack according to an embodiment of the present invention.

In certain DOS attacks on wireless networks, the attacker device sends messages to an AP using plurality of different source (or transmitter) MAC addresses (e.g., using address rotation) which may or may not belong to any legitimate device. For example, raw packet injection drivers (e.g., madwifi driver for Linux) can be used to send such messages. Examples of such DOS attack include authentication flood attack, association flood attack, and EAPOL START flood attack. In such an attack (shown in exemplary diagram of FIG. 3A), the attacker (301) can initiate plurality of connection establishment processes with the AP (302). During these connection establishments, the attacker can identify itself to the AP with different source MAC addresses, for example, by including different MAC addresses in the source MAC address field of different connection establishment initiation messages. For example, a connection establishment process can be initiated via sending connection requests (303) such as authentication request message, association request message and/or EAPOL START request message as described in the IEEE 802.11 MAC protocol standard. The requester can identify itself to the AP by including its MAC address in the source MAC address field in the frame associated with the authentication request, association request, and/or EAPOL START request. For each source MAC address identified in the connection establishment processes, certain computational resources (e.g., memory 304 to store information associated with the source MAC address) need to be allocated on the AP. By initiating large number of connection establishment processes from different source MAC addresses (e.g., almost simultaneously), the attacker can overwhelm the AP's computational resources. This can cause the AP to become inoperational and/or deny connection establishment to legitimate users for lack of residual computational resources. In another example of DOS attack called fake AP attack, the attack is directed to wireless security monitoring systems. In this attack, the attacker device can send frames with plurality of source (e.g., transmitter) identities, respectively, to overwhelm the security monitoring systems. For example, the attacker device can send N beacon frames (as sent by APs in the IEEE 802.11 network), where N is integer, each beacon frame including a different source MAC address (e.g., in the AP MAC address field of the frame). This can trick the security monitoring system into believing that there are N different AP devices operational in the region. Moreover, if N is large, the computational resources of the security monitoring system may get exhausted (e.g., to store records associated with N APs, to track state changes of N APs etc.). Similarly, fake client tool can trick the security system into believing that there are N different client devices operating in the region (e.g., by sending out probe requests with varying source MAC addresses in them).

Figure 3B:
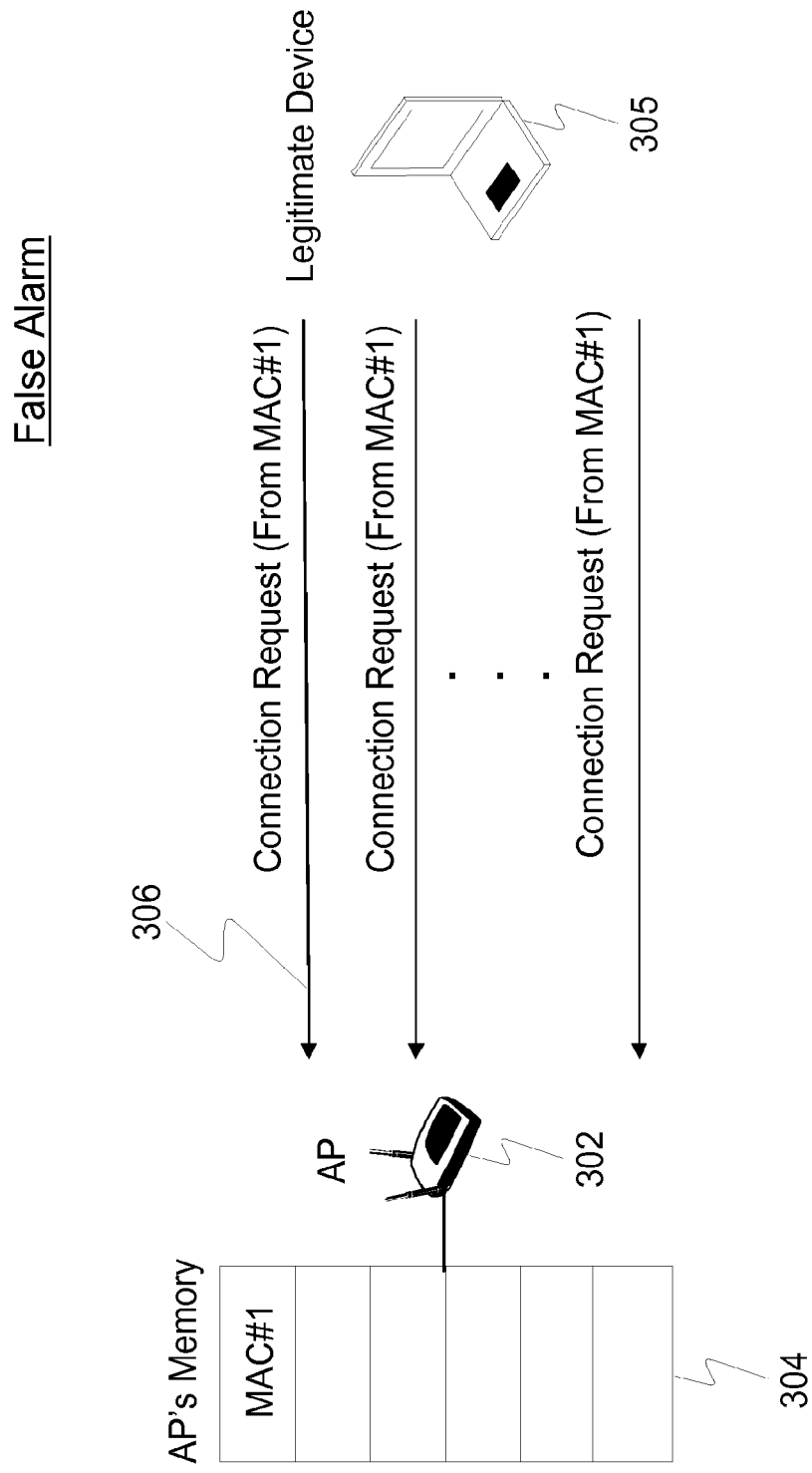
FIG. 3B is a simplified communication flow illustrating a connection attempt by a legitimate device according to an embodiment of the present invention.

Conventional techniques have attempted detecting such attacks with varying degrees of success. For example, certain principles of conventional threshold crossing/flooding/anomaly detection can be applied to this problem in a naïve manner. Accordingly, the number of connection establishment initiation messages (association/authentication/EAPOL START request) that are detected (e.g., detected by sensors) over a predetermined time interval are counted. If the number crosses a predetermined threshold, a security alarm is generated. There are various disadvantages of this technique. For example, often times, a legitimate wireless client (e.g., laptop equipped with WiFi radio card) can send abnormally high number of connection establishment initiation messages (e.g., association/authentication/EAPOL START request). This can happen if the wireless client (305) experiences frequent disconnections (e.g., due to intermittent radio coverage, error conditions, and/or flaws in software/hardware of the wireless client device). In these situations (illustrated in exemplary diagram of FIG. 3B), the conventional technique can generate false alarms on the DOS attack, i.e., incorrectly infer that the DOS attack such as association, authentication, and/or EAPOL START flood is in progress. Notably, in the above false alarm situations, the plurality of connection establishment initiation requests (306) come from only one source MAC address (e.g., MAC address of the legitimate wireless client 305) and hence computational resources on the AP are not at risk of exhaustion. A technique that realizes this fact to improve upon naïve threshold crossing/flooding/anomaly detection techniques is described below.

Figure 3C:
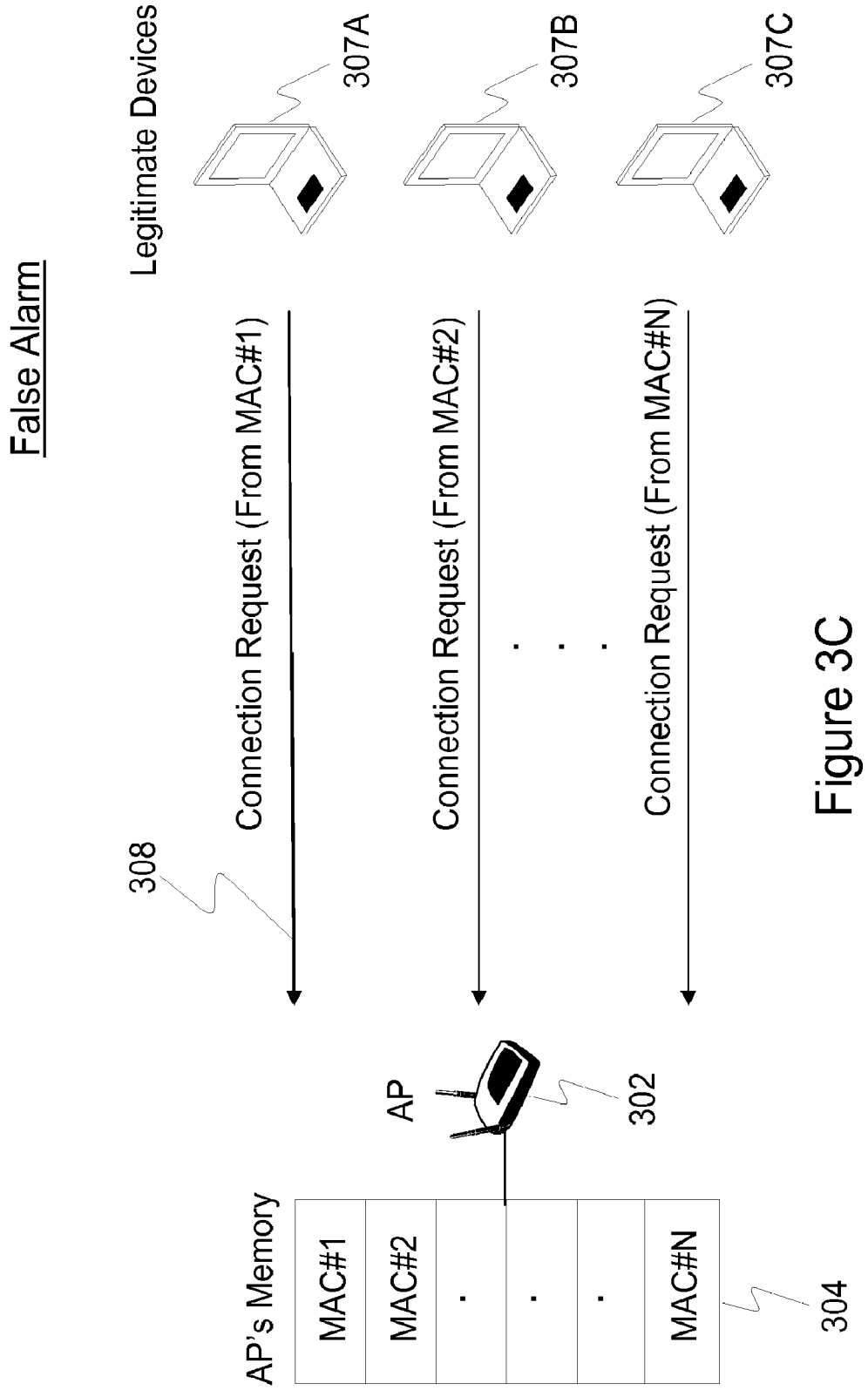
FIG. 3C is a simplified communication flow illustrating connection attempts by multiple devices according to an embodiment of the present invention.

As per this technique, in addition to threshold crossing of the number of connection establishment initiation messages, a criterion of distinct source MAC addresses is enforced. For example, before a DOS attack alarm is generated, it is ensured at least a threshold number of distinct source MAC addresses are found in the detected connection establishment initiation messages. While this technique attains some improvement in reducing false alarms, it can still generate some false alarms. In one exemplary scenario, the AP may direct all its connected clients to re-connect. This can for example, be done if AP is overloaded with connections and want the clients to look for neighboring APs which may also be able to provide wireless connectivity to these clients. In such a situation (illustrated by exemplary diagram of FIG. 3C), many legitimate clients (307) initiate connection establishment processes (connection requests 308) nearly simultaneously. This causes both the threshold tests (the sheer number of messages and the number of distinct source MAC addresses) to pass and a false alarm on DOS attack can be generated.

Notably false alarms in security systems (e.g., DOS attack alarms) are highly undesirable. First, they consume administrative resources (e.g., administrator's time and effort) in chasing them. Second, after spending chasing time and effort, if it is found that there is no real attack, it leads to frustration and later indifference to such alarms causing real attackers to escape. Moreover in the techniques described thus far, setting correct values of thresholds is extremely difficult. This is because, the normal volume of connection establishment initiation messages (with or without deference to distinctness of source MAC addresses) depends on variety of factors including size of the wireless network, density of wireless clients within the network, activity levels of wireless clients, and their routine connections/disconnections. If thresholds are set too low, large number of false alarms can occur and if they are set too high real attacks may go undetected. In an embodiment, the present invention overcomes these practical problems of false alarms and threshold settings by providing improved detection technique.

According to this embodiment of the present invention, a technique is provided to detect when messages including different source MAC addresses in them in fact come from the same device (i.e., to detect address rotation). This inference can be used to generate genuine DOS alarms. Depending upon the type of messages (e.g., association request, authentication request, EAPOL START request), the appropriate DOS alarm can then be generated. Advantageously, this approach eliminates or greatly reduces false alarms and overcomes difficulties in threshold setting. While in this embodiment, the address rotation detection is used to detect certain DOS attacks in wireless networks, it can also be used in other applications that will be apparent to those with ordinary skill in the art based on the teachings of the present specification.

Figure 4A:
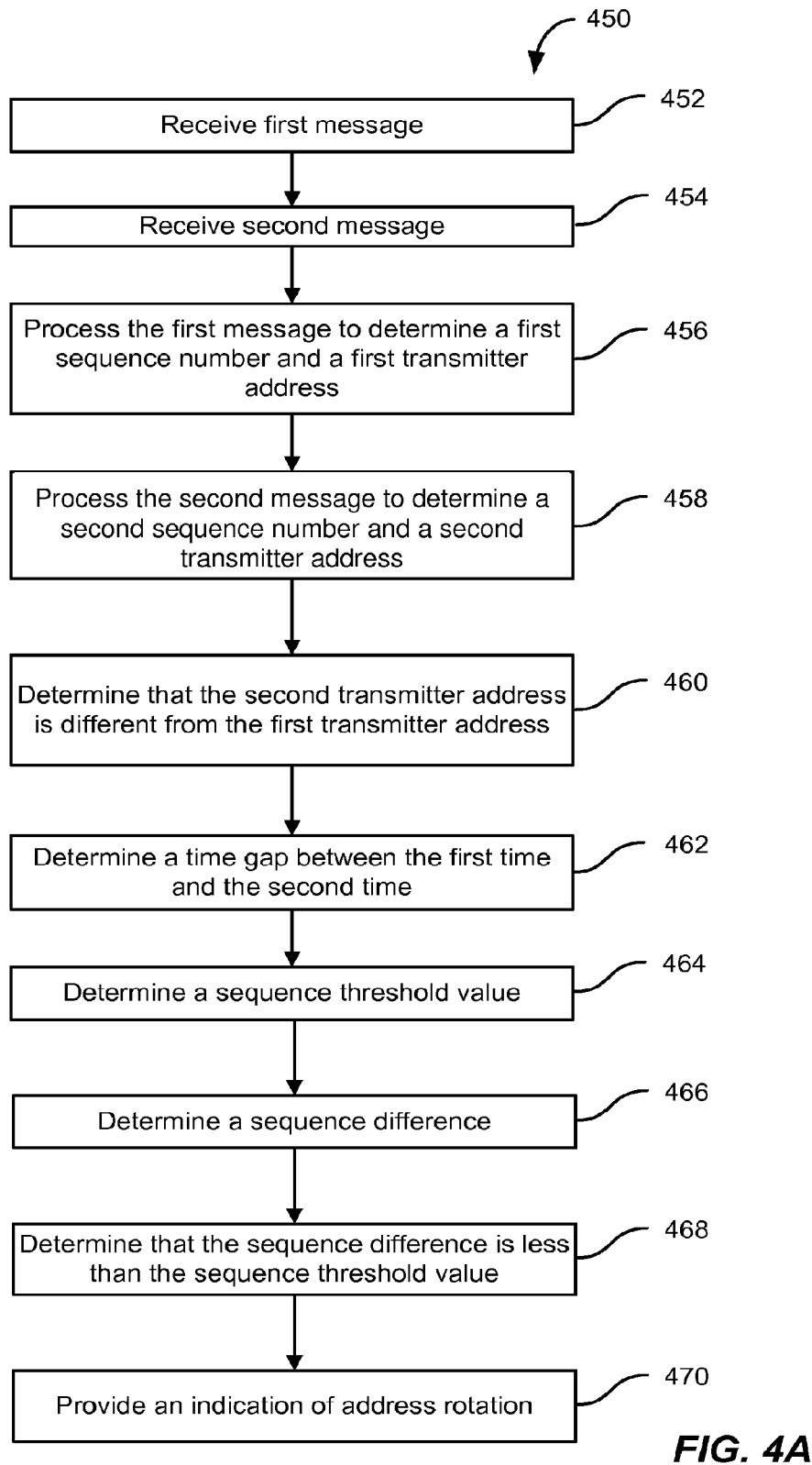
FIG. 4A is a simplified flowchart illustrating a method of detecting address rotation according to an embodiment of the present invention.

In an embodiment of the present invention, a method to detect address rotation is provided. The method uses a combination of sequence number and time gap analyses on the packets (e.g., 802.11 frames) that are received (e.g., captured by the sensors). FIG. 4A is a simplified flowchart illustrating a method of detecting a DOS attack according to an embodiment of the present invention. The method 450 can be utilized by a sniffer device and includes receiving, at a first time, a first message (452). The first message is transmitted by a wireless device in the network. The method also includes receiving, at a second time, a second message transmitted by the wireless device (454). In an embodiment, at least one of the first message or the second message comprises an IEEE 802.11 type frame.

The first message is processed (456) to determine a first sequence number and a first transmitter address. Additionally, the second message is processed (458) to determine a second sequence number and a second transmitter address. A determination is made that the second transmitter address is different from the first transmitter address (460), a time gap is determined between the first time and the second time (462), and a determination is made of a sequence threshold value (464), based, in part, on the time gap. A determination of a sequence difference between the first sequence number and the second sequence number is made (466) and that the sequence difference is less than the sequence threshold value (468). The sniffer provides an indication of address rotation (470).

In some embodiments, a counter of the indications of the address rotation by the device is increased as address rotation is detected. Thus, the method further includes determining that the counter exceeds a predetermined threshold and determining an instance of address rotation in some embodiments.

According to embodiments of the present invention, a number of attacks are detected utilizing the methods and structures described throughout the present specification. For example, address rotation may make up at least a portion of one or more attacks including an authentication flood attack, an association flood attack, or an EAPOL START flood attack.

It should be appreciated that the specific steps illustrated in FIG. 4A provide a particular method of detecting address rotation according to an embodiment of the present invention. Other sequences of steps may also be performed according to alternative embodiments. For example, alternative embodiments of the present invention may perform the steps outlined above in a different order. Moreover, the individual steps illustrated in FIG. 4A may include multiple sub-steps that may be performed in various sequences as appropriate to the individual step. Furthermore, additional steps may be added or removed depending on the particular applications. One of ordinary skill in the art would recognize many variations, modifications, and alternatives based on the teachings of the present specification.

Figure 4B:
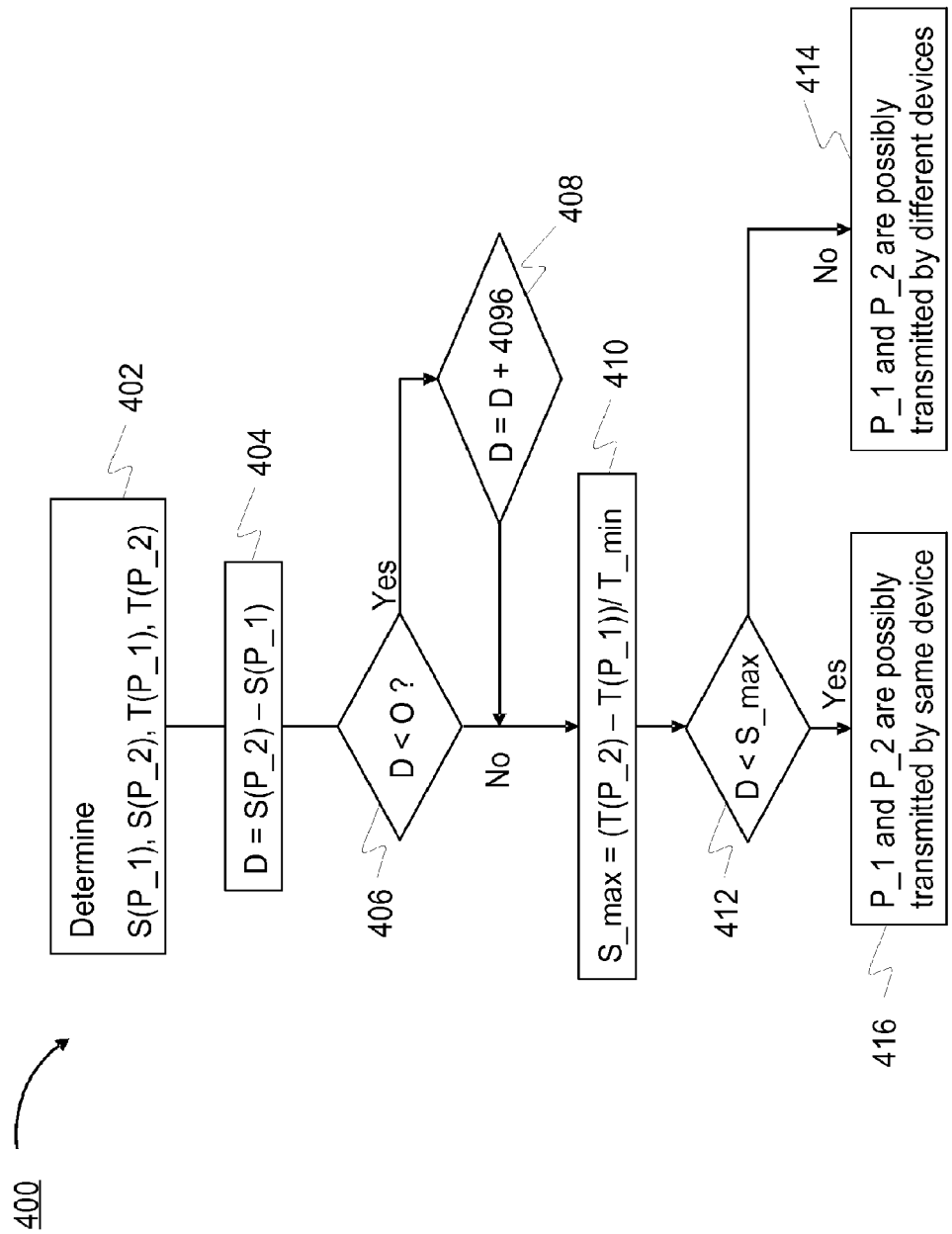
FIG. 4B is a simplified flowchart illustrating computations used to detect address rotation according to an embodiment of the present invention.

Another exemplary method 400 according to this embodiment of the present invention is illustrated in FIG. 4B. This diagram is merely an example which should not unduly limit the scope of the invention.

Let $P\_1$ and $P\_2$ represent the two captured packets wherein $P\_2$ is captured after $P\_1$. As merely an example, in one preferred embodiment for DOS attack detection, $P\_1$ and $P\_2$ can be association request packets, authentication request packets, EAPOL start packets or mixture thereof. As shown in FIG. 4B, at step 402, the method 400 can determine $T(P\_1)$ and $T(P\_2)$, which denote respectively, the receive timestamps for the two packets $P\_1$ and $P\_2$ (e.g., the times of reception of the packets per the sensor's clock), wherein $T(P\_1)<T(P\_2)$. As per the 802.11 MAC standard, packets transmitted by any given transmitter include sequence numbers in them. Preferably, the sequence number is incremented by 1 for every transmitted packet and is included in the header of the transmitted packet (frame). The sequence numbers are useful to detect and retransmit the frames that are lost on wireless channel (e.g., due to interference, weak signal strength, collision with other frames etc.). The sequence number values can be between 0 and 4095, and a wrap around occurs when the value exceeds 4095. The present invention makes uses of these sequence numbers in a novel way in combination with time gap analysis. At step 402, the method 400 can determine $S(P\_1)$ and $S(P\_2)$, which denote respectively, the values of the sequence number fields in the two packets $P\_1$ and $P\_2$.

Let T_min denote an approximation to the minimum time between two consecutive packets transmitted by a single transmitter. This time primarily depends on factors such as size of packet, transmission speed, and total devices sharing the wireless bandwidth (as other devices can send intervening packets when they get access to channel). A low side approximation to T_min can be computed using a small size packet and a high transmission speed. As merely an example, a conservative value for T_min can be computed based on a 100 byte packet transmitted at 54 Mbps, as 100 bytes divided by 54 Mbps (Megabit per second)=14 nanosecond. Alternatively, depending upon the embodiment, a high side approximation value can be computed using a large size packet and a low transmission speed, and accounting for intervening traffic.

The method according to an embodiment of the present invention can compute the sequence number difference D as (step 404), $$D=S(P\_2)-S(P\_1).$$

If D is less than 0, it is updated to D+4096 to account for wrap around of sequence numbers, in steps 406 and 408. The method further computes at step 410, a value of S_max which denotes an approximation to maximum sequence number gap (e.g., maximum value of D) that is allowed between the two packets if they were transmitted by the same device as:

$$S\_max = (T(P\_2) - T(P\_1))/T\_min.$$

The method compares D with S_max in step 412. In a preferred embodiment, if D is greater than S_max, it can be inferred with certain confidence that the packets P_1 and P_2 were transmitted by two different devices (i.e., without deference to source MAC addresses in them) (step 414). If D<S_max it can be concluded with certain confidence that they were transmitted by the same device (i.e., without deference to source MAC addresses in them) (step 416). In this embodiment, the address rotation can be inferred if a set of N packets, where N is integer, is inferred to be transmitted by the same device, but overall more than one source MAC addresses are detected among them.

Figure 5:
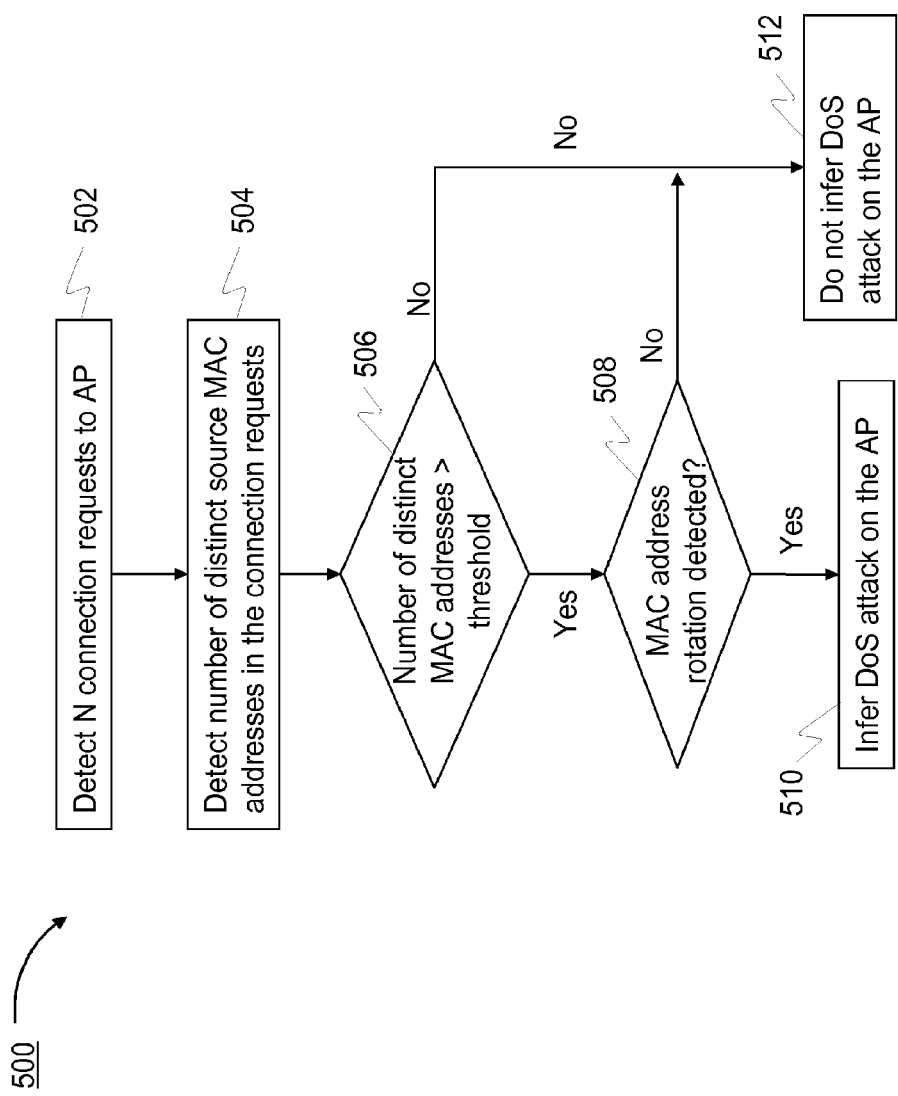
FIG. 5 is a simplified flowchart illustrating a method of detecting a DOS attack according to another embodiment of the present invention.

The method 400 can be used to accurately detect DOS attack without false alarms. A method 500 for detecting DOS attack on an AP according to an embodiment of the present invention is illustrated in FIG. 5. This diagram is merely an example which should not unduly limit the scope of the invention. At step 502, the method 500 can detect N connection requests (e.g., N connection request packets P_1, P_2, . . . , P_N) directed to an AP. For example, the packets (frames) P_1, P_2, . . . , P_N can represent association request messages destined to the AP. As another example, the P_1, P_2, . . . , P_N can represent association, authentication, EAPOL START request messages, or mixture thereof, destined to the AP. The method can detect source MAC address in each of these N packets and determine the number of distinct source MAC addresses found (step 504). The method at step 506 can determine if the number of distinct source MAC addresses found exceeds a predetermined threshold. Notably, in method 500, the condition of detecting at least a threshold number of distinct MAC addresses among the N connection requests is without the risk of false alarms as in conventional techniques. Moreover, the distinct MAC addresses threshold now depends on the resources of the AP (e.g., AP's rated connection handling capacity such as 16, 64, 128 etc.), and hence easy to set, unlike threshold depending on the dynamics of the wireless network as in conventional techniques. Moreover, the method 500 at step 508 can detect if an address rotation is detected. For example, the method can detect if the connection requests P_1, . . . , P_N, or at least a subset among them preferably including at least two distinct source MAC addresses is transmitted by the same device. If the address rotation is detected, DOS attack on the AP is inferred in step 510, else DOS attacks on the AP is not inferred as shown in step 512. In an embodiment, the MAC address rotation detection logic of the present invention can also be advantageously combined with the conventional threshold crossing/flooding/anomaly detection techniques to reduce or eliminate false alarms that are characteristic of the conventional techniques.

In certain other types of DOS attacks on wireless networks, the attacker device sends (e.g., broadcasts over the wireless medium) certain messages to break connections (associations) and/or disrupt connection attempts between the AP and its clients. For example, raw packet injection drivers (e.g., madwifi driver for Linux) can be used to send such messages. Examples of such DOS attack include broadcast deauthentication attack, unicast deauthentication attack, premature EAP success attack, premature EAP failure attack, broadcast disassociation attack, and unicast disassociation attack. For example, in the broadcast deauthentication attack, an attacker device can send broadcast deauthentication messages over the wireless medium by spoofing MAC address of a victim AP. That is, the attacker device sends deauthentication messages including AP's MAC address as the source MAC address in the deauthentication messages. This can trick the stations connected to the AP into believing that the AP wants the stations to disconnect and they do so. This can disrupt wireless connections between the victim AP and the wireless clients connected to it. As another example, in the unicast deauthentication attack, the attacker device can send deauthentication messages over the wireless medium by spoofing MAC address of the victim AP. These messages can be addressed to MAC address of a victim wireless client. Alternatively, the attacker device can send deauthentication messages over the wireless medium by spoofing MAC address of the victim wireless client. These messages can be addressed to the MAC address of the victim AP.

Conventional techniques have attempted detecting such attacks with varying degrees of success. For example, certain principles of conventional threshold crossing/flooding/anomaly detection can be applied to this problem in a naïve manner. For example, the number of deauthentication that are detected (e.g., detected by sensors) over a predetermined time interval are counted. If the number crosses a predetermined threshold, a security alarm is generated. There are various disadvantages of this technique. For example, often times, large number of deauthentication messages can be detected in wireless network during normal operation. This can, for example, occur in high mobility scenarios, where clients often disconnect from one AP to connect to another. In these and other situations, the conventional technique can generate false alarms on the DOS attack, i.e., incorrectly infer that the DOS attack such as deauthentication attack is in progress. A technique that realizes this fact to improve upon naïve threshold crossing/flooding/anomaly detection techniques is described below.

In this technique, in addition to threshold crossing, the security monitoring system can detect existence of MAC address spoofing (e.g., two devices claiming the same MAC address—one being legitimate device and the other being attacker device). While certain conventional techniques based on sequence number analysis can detect MAC address spoofing in wireless networks, the present applicants recognize that these techniques can create large number of false alarms. For example, in one technique described in the U.S. patent application publication 20030185244 to Wu, Miles et al. entitled "Detecting counterfeit access point in a wireless local area network", detection of non-sequential sequence numbers in successive frames (beacon frames) is used to infer existence of MAC spoofing. However notably, the sequence number space in the IEEE 802.11 frames is only 4096 (11 bit) and hence the sequence numbers in successive frames wrap around very quickly. This creates potential for false alarms. For example, suppose a sensor captures a frame including certain source MAC address X and sequence number 3000 on certain radio channel. Suppose the sensor goes to scan other channels after that and comes back to same channel again after certain period of time (e.g., after few tens of milliseconds). Suppose the sequence number for the device is wrapped around by this time and the next packet the sensor captures from the same device has source MAC address X and sequence number 20. Since the sequence numbers detected (e.g., 3000 followed by 20) are now non-sequential, MAC spoofing for address X can be incorrectly inferred.

In an embodiment, the present invention provides an improved method to accurately detect MAC spoofing (e.g., eliminate or reduce false alarms) and to combine this MAC spoofing detection with the conventional threshold detection for accurate detection of DOS attacks and to reduce or eliminate false alarms. For example, the technique as in method 400 can be used to determine, via combined sequence number analysis and time gap analysis, whether two packets received (e.g., received by the sensor) can be transmitted by the same device or different devices. In this embodiment, if the two packets are inferred to be transmitted by different devices and include the same source MAC address in them, indication of address spoofing (e.g., MAC address spoofing) can be inferred. In this embodiment, the address spoofing can be inferred if indications of address spoofing are obtained for a threshold number of received packet pairs. Notably, an improved spoofing detection according to the present invention can be combined with conventional threshold detector to eliminate false alarms during DOS attack detection.

Figure 6:
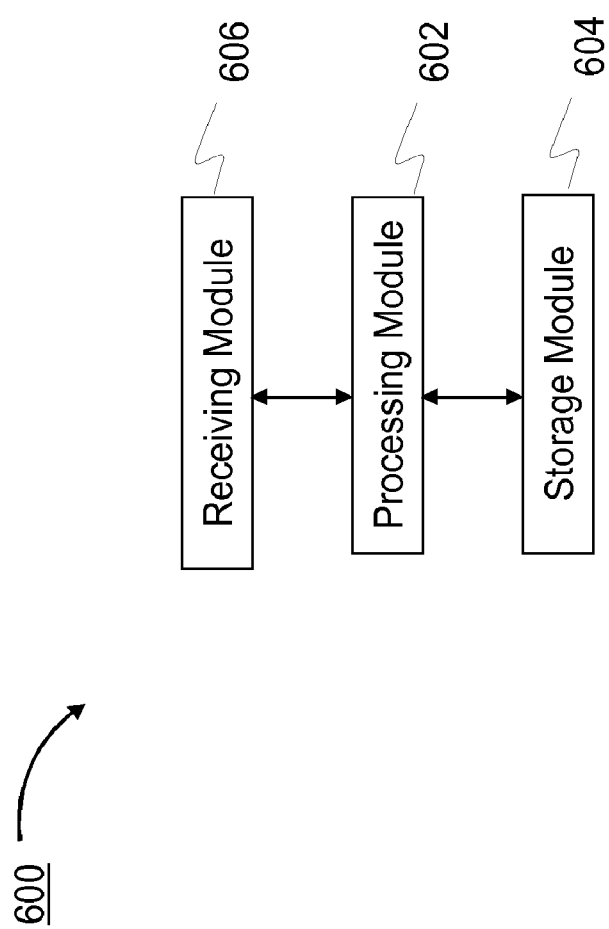
FIG. 6 is a simplified schematic diagram of a system for detecting address rotation by a device according to an embodiment of the present invention.

A system 600 according to an embodiment of the present invention is illustrated in FIG. 6. This diagram is merely an example which should not unduly limit the scope of the invention. As shown, the system 600 can include a processing module 602. The processing module preferably includes a micro processing device. Moreover, the processing module can be coupled to a storage module 604 (e.g., RAM, ROM, hard disk, floppy disk etc.). The storage module can comprise one or more computer executable codes (e.g., sets of instructions that can be executed by the processing unit 602) for performing one or more processes according to embodiments of the present invention. The system can comprise a receiving module 606 coupled to the processing module. The receiving module can include a wireless communication receiving interface (e.g., wireless NIC). The receiving interface can preferably receive messages (e.g., packets, IEEE 802.11 frames etc.) transmitted over the wireless network. In an embodiment, the receiving module can also associate a timestamp (e.g., a receive timestamp) to the received message. Alternatively, timestamp can be associated with the messages by the processing module. The messages received by the receiving module can be stored in the storage module. The one or more codes in the storage module can process these messages to identify source MAC addresses, sequence numbers etc. in them. The one or more codes can further perform sequence number analysis and time gap analysis according to embodiments of the present invention. The one or more codes can also perform detection of DOS attacks according to embodiments of the present invention.

What is claimed is:

1. A method for detecting address rotation by a device in a communication network, the method comprising:
   receiving, at a first time, a first message transmitted by the device;
   receiving, at a second time, a second message transmitted by the device;
   processing the first message to determine a first sequence number included in the first message and a first transmitter address included in the first message;
   processing the second message to determine a second sequence number included in the second message and a second transmitter address included in the second message;
   determining that the second transmitter address is different from the first transmitter address;
   determining a time gap between the first time and the second time;
   determining, based, in part, on the time gap, a sequence threshold value;
   determining a sequence difference between the first sequence number and the second sequence number;
   determining that the sequence difference is less than the sequence threshold value; and
   providing an indication of address rotation by the device,
   wherein the address rotation process including a single wireless device transmitting a plurality of messages including a plurality of distinct transmitter addresses, respectively.

2. The method of claim 1 wherein at least one of the first message or the second message comprises an IEEE 802.11 type frame.

3. The method of claim 1 further comprising increasing a counter of the indications of the address rotation by the device.

4. The method of claim 3 further comprising:
   determining that the counter exceeds a predetermined threshold; and
   determining an instance of address rotation.

5. The method of claim 1 wherein the address rotation by the device is associated with at least one of an authentication flood attack, an association flood attack, or an EAPOL START flood attack by the device.

6. A method for reducing false alarms during detection of address spoofing in a communication network, the address spoofing being characterized by a plurality of devices in the communication network claiming a common transmitter address, the method comprising:
   receiving two messages transmitted over wireless network, the wireless network being characterized by a denial of service attack process which includes transmitting of spoofed messages from an attacker device, the two messages including a first message and a second message;
   processing the two messages to determine a first sequence number and a second sequence number included in the first message and the second message, respectively;
   processing the two messages to determine a first transmitter address and a second transmitter address included in the first message and the second message, respectively;
   ascertaining that the second transmitter address is the same as the first transmitter address;
   determining a time gap between the two messages;
   determining, based at least on the time gap, a range within which the second sequence number is expected to lie with respect to the first sequence number; and generating an indication of the address spoofing if the second sequence number lies outside the range within which the second sequence number is expected to lie,
   wherein the first sequence number is indicative of an order in which the first message is transmitted with respect to other messages that are transmitted by transmitter device of the first message and the second sequence number is indicative of an order in which the second message is transmitted with respect to other messages that are transmitted by transmitter device of the second message.

7. The method of claim 6 wherein the determining the time gap between the two messages includes determining a difference between time instants of the receiving the two messages, respectively.

8. The method of claim 6 wherein the determining the range within which the second sequence number is expected to lie is further based on at least one of a plurality of transmission speeds of the wireless network.

9. The method of claim 6, and further comprising not generating the indication of the address spoofing if the second sequence number lies in the range within which the second sequence number is expected to lie.

10. The method of claim 6 wherein a sequence number included in a message is as per the IEEE 802.11 standard.

11. A system for detecting address rotation by a device in a communication network, the system comprising:

a receiver module including one or more wireless communication receiving interfaces for receiving a plurality of messages transmitted over a wireless network;
a storage module including one or more computer memory devices for storing computer executable code, the computer executable code comprising:
a first portion of the code for identifying transmitter addresses within the plurality of messages received by the receiver module, respectively;
a second portion of the code for computing one or more receiving time gaps associated with one or more message pairs, respectively, the one or more message pairs comprising messages from the plurality of messages received by the receiver module, wherein two messages in each of the one or more message pairs include transmitter addresses which are different from one another;
a third portion of the code for computing one or more sequence number threshold values associated with the one or more receiving time gaps, respectively;
a fourth portion of the code for computing one or more sequence number differences associated with the one or more message pairs, respectively; and
a fifth portion of the code for comparing the one or more sequence number differences with the one or more sequence number threshold values, respectively;
and a processor module including one or more micro processing devices for executing the first, the second, the third, the fourth, the fifth, the sixth, and the seventh portions of the code to detect the address rotation by the device,
wherein the address rotation process including a single wireless device transmitting a plurality of messages including a plurality of distinct transmitter addresses, respectively;
and a sixth portion of the code for identifying that a sequence number difference for at least one message pair from the one or more message pairs is less than a sequence number threshold value associated with the at least one message pair;
and a seventh portion of the code for ascertaining that transmitter addresses for messages within the at least one message pair are distinct.

12. The system of claim 11 wherein the computer executable code within the storage module comprises an eight portion of the code for generating indication about the address rotation by the device.

13. A system for reducing false alarms during detection of address spoofing in a communication network, the address spoofing being characterized by a plurality of devices in the communication network claiming a common transmitter address, the method comprising:

a receiver module including one or more wireless communication receiving interfaces for receiving a plurality of messages transmitted over a wireless network;
a processor module; and
a storage module which stores computer readable instructions, which are executable by the processor module to perform steps of:
receiving a first message and a second message transmitted over the wireless network, the wireless network being characterized by a denial of service attack process which includes transmitting of spoofed messages from an attacker device;
processing the first and the second messages to determine a first sequence number and a second sequence number included in the first message and the second message, respectively;
processing the first and the second messages to determine a first transmitter address and a second transmitter address included in the first message and the second message, respectively;
ascertaining that the second transmitter address is the same as the first transmitter address;
determining a time gap between the two messages;
determining, based at least on the time gap, a range within which the second sequence number is expected to lie with respect to the first sequence number; and
generating an indication of the address spoofing if the second sequence number lies outside the range within which the second sequence number is expected to lie,
wherein the first sequence number is indicative of an order in which the first message is transmitted with respect to other messages that are transmitted by transmitter device of the first message and the second sequence number is indicative of an order in which the second message is transmitted with respect to other messages that are transmitted by transmitter device of the second message.

14. The system of claim 13 wherein the determining the time gap between the two messages includes determining a difference between time instants of the receiving the two messages, respectively.

15. The system of claim 13 wherein the determining the range within which the second sequence number is expected to lie is further based on at least one of a plurality of transmission speeds of the wireless network.

16. The system of claim 13 wherein the computer readable instructions are further executable by the processor module to perform step of not generating the indication of the address spoofing if the second sequence number lies in the range within which the second sequence number is expected to lie.

* * * * *